(12) United States Patent
Alliot (10) Patent No.: US 9,225,469 B2
(45) Date of Patent: Dec. 29, 2015

(54) BLIND TRANSPORT FORMAT DETECTION DEPENDING ON THE CONDITIONS OF RECEPTION OF THE SIGNAL

(71) Applicant: ST-Ericsson SA, Plan-les-Ouates (CH)

(72) Inventor: Eric Alliot, Mouans-Sartoux (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/412,757

(22) PCT Filed: Jun. 26, 2013

(86) PCT No.: PCT/EP2013/063420
§ 371 (c)(1),
(2) Date: Jan. 5, 2015

(87) PCT Pub. No.: WO2014/023472
PCT Pub. Date: Feb. 13, 2014

(65) Prior Publication Data
US 2015/0172000 A1 Jun. 18, 2015

Related U.S. Application Data

(60) Provisional application No. 61/695,619, filed on Aug. 31, 2012.

(30) Foreign Application Priority Data

Aug. 9, 2012 (EP) .................................. 12305992

(51) Int. Cl.
H04L 1/00 (2006.01)
(52) U.S. Cl.
CPC .............. *H04L 1/0054* (2013.01); *H04L 1/005* (2013.01); *H04L 1/0046* (2013.01)
(58) Field of Classification Search
CPC .... H04B 1/71072; H04L 1/20; H04L 1/0045; H04L 1/005; H04L 1/0054; H04L 27/22; H04L 1/0046

USPC .......... 375/259–262, 316, 340, 341; 714/699, 714/746, 786, 795
See application file for complete search history.

(56) References Cited

U.S. PATENT DOCUMENTS 7,676,240 B2 * 3/2010 Rudrapatna ......... H04W 52/228
455/414.1
2004/0133842 A1 7/2004 Oki
(Continued)

FOREIGN PATENT DOCUMENTS

EP 1 387 516 A1 2/2004

OTHER PUBLICATIONS

International Search Report issued in corresponding International application No. PCT/EP2013/063420, date of mailing Aug. 2, 2013.
(Continued)

*Primary Examiner* — Vineeta Panwalkar
(74) *Attorney, Agent, or Firm* — Patent Portfolio Builders PLLC (57) ABSTRACT

A method for determining a length of a message block of k bits from a length candidate set, comprising steps of: —Selecting (401) a length candidate (N) among the set; —Decoding (402) a received frame to form a decoded sequence that includes a message of a length equal to the length candidate (N), by a Viterbi decoder; —Calculating (402) a Viterbi variable (S(N)) for this candidate (N), —Comparing (403) the Viterbi variable with a threshold ($\Delta$), —Repeating the selecting (401), decoding (402) and calculating (402) steps if said Viterbi variable (S(N)) is greater than the threshold ($\Delta$) and if there exists an unselected length candidate among the set; —If the Viterbi variable is greater than a best value ($S_{best}$), updating this best value to the Viterbi variable and updating a best length ($N_{end}$) to this candidate; —Wherein the threshold ($\Delta$) is initially set to a value determined according to the conditions of reception of the receiver.

13 Claims, 4 Drawing Sheets

(56) References Cited

U.S. PATENT DOCUMENTS

2004/0203987 A1* 10/2004 Butala .................. 455/522
2006/0117245 A1   6/2006 Fisher Jeffes et al.
2007/0033478 A1   2/2007 Shieh et al.

OTHER PUBLICATIONS

Written Opinion of the International Searching Authority issued in corresponding International application No. PCT/EP2013/063420, date of mailing Aug. 2, 2013.

Extended European Search Report issued in corresponding European application No. EP 12 30 5992, date of completion of the the search Nov. 23, 2012.

3GPP/ETSI, "Universal Mobile Telecommunications System (UMTS); Multiplexing and channel coding (FDD); (3GPP TS 25.212 version 11.4.0 Release 11)"; ETSI TS125 212 v11.4.0 (Jan. 2013).

3GPP/ETSI, Universal Mobile Telecommunications System (UTMS); User Equipment (UE) conformance specification; Radio transmission and reception (FDD); Part1: Conformance specification (3GPP TS 34.121-4 version 9.3.0 Release 9); ETSI TS 134 121-1 v9.3.0. (Feb. 2011).

* cited by examiner

BLIND TRANSPORT FORMAT DETECTION DEPENDING ON THE CONDITIONS OF RECEPTION OF THE SIGNAL

FIELD OF THE INVENTION

The present invention generally relates to the field of data transmission technology for communication systems. More particularly, it relates to a system and a method for blind transport format detection with cyclic redundancy check.

BACKGROUND OF THE INVENTION

Digital communication makes use of various data transmission methods that convert information - such as voice or video signal - into bits of digital message, and transmit the bits of information after conversion.

The length of the transmitted message is commonly not fixed.

Some solutions consist then in adding to the length information to the transmitted data. However, in some applications, the data rate is low so that adding information in the amount of data to be transmitted should be avoided.

An alternative is to use some error correcting codes, which are transmitted in accompanying the message bits, to determine the length information at recipient side.

In UMTS, WCDMA, and some other 3G mobile telephony systems, cyclic redundancy check (CRC) bits affixed to the message bits have been widely applied to detect the length information of a received message block in certain situations. A mechanism achieving this result is the Blind Transport Format Detection (BTFD).

Figure 1:
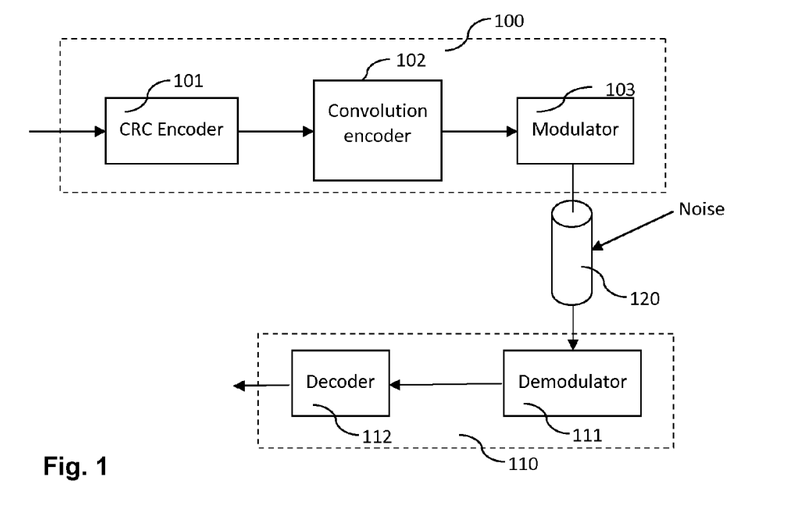
FIG. 1, already described, shows functional architectures for wireless emitter and receivers, in which a BTFD can be used.

FIG. 1 illustrates the context where BTFD mechanism may be used. An emitter 100 comprises a CRC encoder 101. This encoder 101 takes as input a message of k bits, and adds x bits of CRC code (12 or 16 bits in most 3G test cases). These k+x bits are then processed by a convolution encoder 102 that generates encoded data of k+x+m bits, where m is a number of zeros padded after CRC-encoded message block to terminate the trellis of convolutional codes.

The encoded data are then modulated by a modulator 103 and transmitted to a channel 120. This channel being a radio channel, the transmitted signal is perturbed by noise, so that the receiver 110 receives the modulated frame together with noise.

The receiver includes a demodulator 111 to demodulate the received frame and generate a corresponding demodulated frame. The receiver 110 further includes a decoder 112 so that the demodulated frame can be decoded and the unknown message length k can be determined accordingly.

The receiver knows only about a set of candidates for the transport format (i.e. length k of the transmitted messages) from layer-3 negotiation, and the problem it faces is to determine the most probable transport format for the received message.

Figure 2:
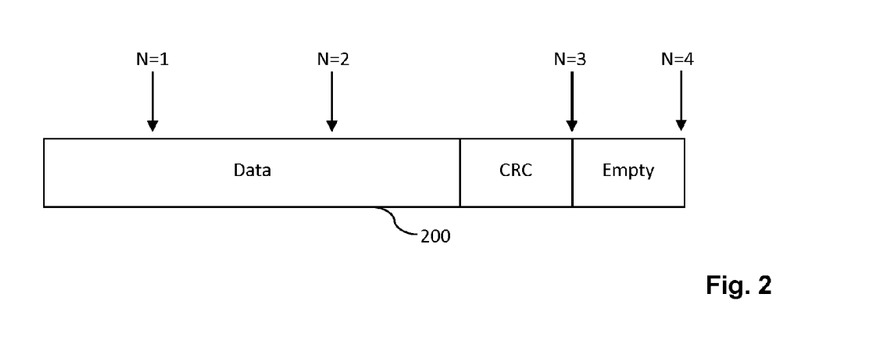
FIG. 2, already described, illustrates an example for a received data frame.

In other words, turning to the FIG. 2 showing a received message, it consists in determining where ends the message made of the Data and CRC fields: four candidates are depicted (N=1, 2, 3, 4) and the receiver should determine that the end bit position Several algorithms have been proposed so far for the demodulator 111 to determine the right length of the transmitted message so as to demodulate it.

The BTFD solution has been the one standardized by the 3GPP and ETSI organizations. The TS125.212 document, entitled "Multiplexing and channel coding (FDD)" describes such an approach and a possible algorithm. This solution is illustrated by the FIG. 3.

Figure 3:
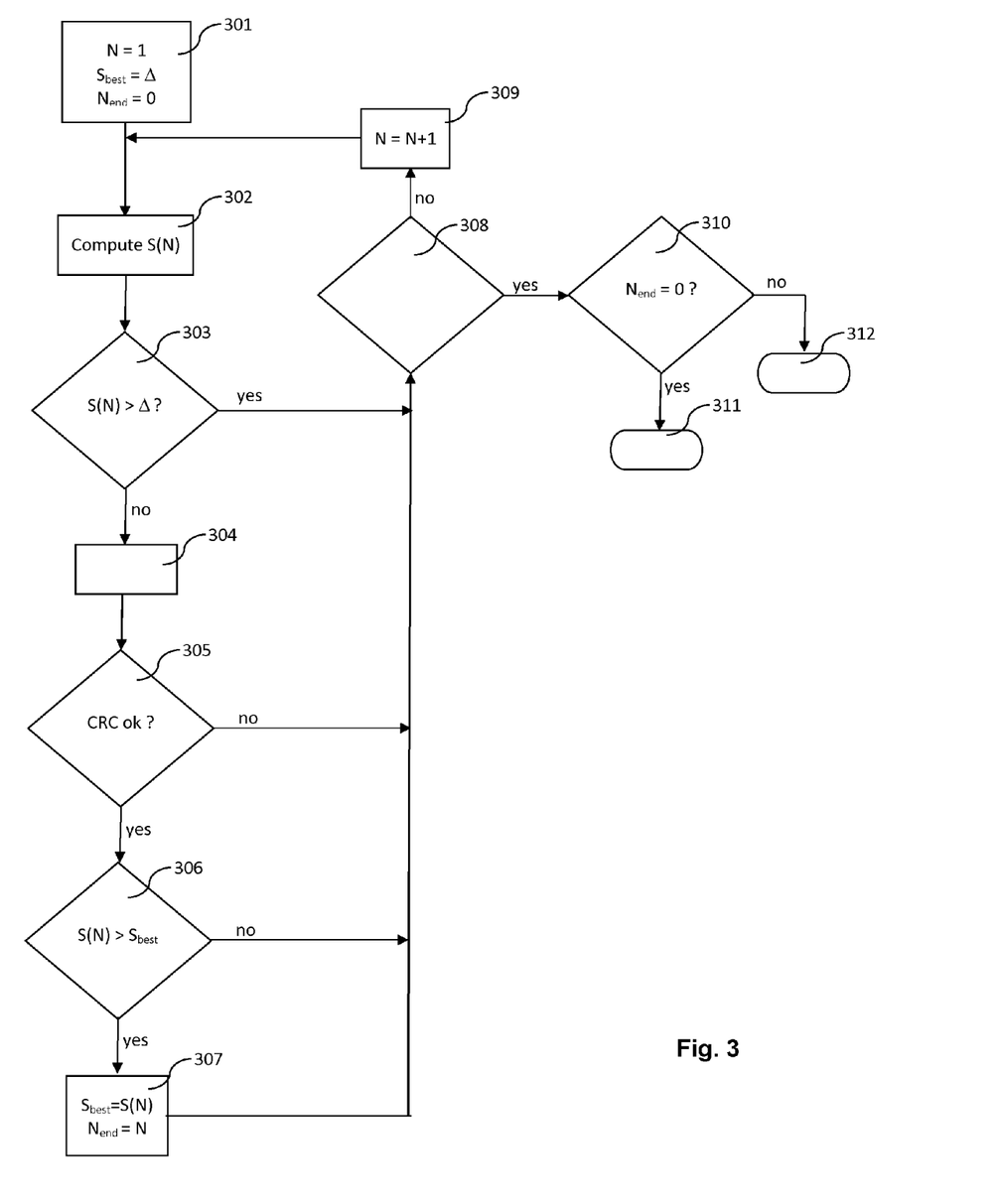
FIG. 3, already described, shows a flowchart of a BTFD method according to the prior art.

This method is based on a Viterbi decoder. The correct trellis path of the Viterbi decoder ends at the zero state at the correct end bit position N.

The BTFD approach traces back the surviving trellis path ending at the zero state (hypothetical trellis path) at each possible end bit position to recover the data sequence. For each recovered data sequence, error detection is performed by checking the CRC and if there is no error the recovered sequence is declared to be correct.

A variable S(N) is defined as:

$$S(N) = -10 \times \log\left(\frac{a_0(N) - a_{min}(N)}{a_{max}(N) - a_{min}(N)}\right) \quad (1)$$

Where $a_{max}(N)$ and $a_{min}(N)$ are the maximum and minimum path-metric values among all survivors at end bit position N, and $a_0(N)$ is the path-metric value at zero state.

In a noiseless transmission, S(N) corresponding to the true (i.e. as transmitted) message length k always equal zero. However, in a noisy transmission, it is unlikely that S(N) will equal zero for the true message length k. Therefore, the test consists in comparing this variable S(N) to a predetermined threshold $\Delta$.

This threshold $\Delta$ is called "path selection threshold" and it is a design parameter.

Coming back to the FIG. 3, the algorithm starts with a initialization step 301 consisting in setting the end bit position N to 1, and two work variables $S_{best}=\Delta$ and $n_{end}=0$. The variable $n_{end}$ represents the best end bit position found so far. The variable $S_{best}$ represents the corresponding best variable S(N) as provided by the Viterbi decoder.

The step 302 consists in determining the variable S(N) for the current value of N, according to the equation (1) given above.

This calculated variable S(N) is then compared with the threshold $\Delta$ at step 303.

If the variable is greater than the threshold, the flow proceeds to step 308 to determine whether any additional length candidate exists. For doing this, it suffices to check if the current value of N is the maximum number in the set of candidates.

If no, i.e. if there exists at least another candidate, the value of N is increased by 1 in step 309 and the process loops to step 302. Otherwise, the flow proceeds to step 310 to determine whether the best solution $n_{end}$ is equal to zero.

If $n_{end}=0$, the decoding process ends at step 311 and the received message is declared to be in error.

If $n_{end}>0$, then the value of $n_{end}$ is considered to be the best candidate for the real length of the received message (step 312).

The other branch of the process starting at step 303 is triggered when $S(N) \leq \Delta$. Then, at a step 304, the Viterbi decoder traces back the received message so as to output a block of bits according to the current value of N.

This block of bits is then processed by a CRC checker 305. If the CRC is not correct, the flow proceeds to the step 308 already explained. If the CRC is correct, then it means that a legitimate message has been found. However, the variable S(N) is to be compared with the currently best value $S_{best}$, at the step 306, in order to determine if this legitimate message is better than the previously-found one(s).

If $S(N) \leq S_{best}$, the flow proceeds also to step 308.

In the situation where $S(N)>S_{best}$, then a step 307 consists in setting new values to the work variables $S_{best}$ and $N_{end}$, so as: $S_{best}=S(N)$ and $N_{end}=N$, and the flow also proceed to step 308, for going on with following candidates or ending the process.

Nonetheless, as any process based on statistical analysis (here, the Viterbi decoding algorithm), the receiver makes errors, with a rate depending notably on the noise in the transmission channel. The above-described approach aims at keeping these decoding errors as low as possible, but there is still a need to improve the situation by proposing a BTFD process optimizing the decoding performances.

SUMMARY OF THE INVENTION

This is achieved with a method for determining a length of a message block of k bits from a length candidate set, received by a receiver through a wireless communication channel, comprising steps of:

Selecting a length candidate among this length candidate set;
Decoding a received frame to form a decoded sequence that includes a message of a length equal to the length candidate, by a Viterbi decoder;
Calculating a Viterbi variable for the length candidate, by the Viterbi decoder.
Comparing this Viterbi variable with a threshold,
Repeating the selecting, decoding and calculating steps if the Viterbi variable is greater than the threshold value, and if there exists an unselected length candidate among the length candidate set;
If said Viterbi variable is greater than a best value, updating the best value to the value of the Viterbi variable and updating a best length to the length candidate;
Wherein said threshold is initially set to a value determined according to the conditions of reception of the receiver.

According embodiments of the invention, this method may also comprise one or several of the following features:

The best length may be considered as the best estimate of k when all length candidates of the set have been selected and if the best length is not null.
The threshold may be defined as a function of at least one criterion representative of the conditions of reception.
The threshold may be set to a high value when a criterion is below a pivot value and to a low value ($\Delta_{low}$) when the criterion is above this pivot value.
An hysteresis approach may be used between a low state where the threshold is set to a low value and a high state where the threshold is set to a high value, and the transition from said high state to said low state is triggered when said criterion is below a low pivot value ($PV_{low}$) and the transition from said low state ($S_L$) to said high state ($S_H$) is triggered when said criterion is above a high pivot value ($PV_{high}$).
This at least one criterion may comprise a noise-to-signal ratio.
This noise-to-signal ratio can be estimated by a DPCH_Ec/Ioc parameter.
The noise-to-signal ratio can also be estimated by a signal-to-interference ratio measured on the DPCH channel.
The threshold can be fixed.
The step of comparing the Viterbi variable with a threshold may be replaced by a step of comparing said Viterbi variable with the best value, this best value being initially set to the threshold (A).

The method may also comprise a step of tracing back from the length candidate, this step being implemented by the Viterbi decoder.
The method may further comprise a step of computing a CRC check on the block of bits outputted by the Viterbi decoder.

This is also achieved with a computer program product comprising a computer readable medium, having thereon a computer program comprising program instructions, the computer program being loadable into a data-processing unit and adapted to cause execution of the method when the computer program is run by the data-processing unit.

Another object of the invention is a data storage medium having recorded thereon a computer program comprising instructions for performing the method.

Another object of the invention is a receiver for determining a length of a message block of k bits from a length candidate set, received through a wireless communication channel to which the receiver is connected, comprising means for:

Selecting a length candidate among the length candidate set;
Decoding a received frame to form a decoded sequence that includes a message of a length equal to the length candidate, by a Viterbi decoder of the receiver;
Calculating a Viterbi variable for the length candidate, by this Viterbi decoder.
Comparing the Viterbi variable with a threshold,
Repeating the selecting decoding and calculating steps if the Viterbi variable is greater than the threshold value, and if there exists an unselected length candidate among the length candidate set;
If the Viterbi variable is greater than a best value, updating this best value to the value of the Viterbi variable and updating a best length to this length candidate;
And wherein the threshold is initially set to a value determined according to the conditions of reception of the receiver.

Further features and advantages of embodiments of the invention will appear from the following description of some embodiments of the invention, given as non-limiting examples, with reference to the accompanying drawings listed hereunder.

DETAILED DESCRIPTION OF EMBODIMENTS OF THE INVENTION

In order to ensure an appropriate behavior of the global system, it is essential to ensure the ability of the blind transport format detection (BTFD) to determine the right transport format (TF) so as the received messages are well decoded by the receiver.

In order to do that, the 3GPP/ETSI document TS 134.121 entitled "Terminal Conformance Specification, Radio Transmission and Reception (FDD) specifies two criteria that shall remain under certain threshold values:

The block error ratio (BLER)
The false format detection ratio (FDR).

The performance, as defined by BLER and FDR values, depends on the geometry conditions of the receiver, i.e. the DPCH_Ec/Ioc parameter. This parameter is defined by $$\frac{DPCH\_Ec}{I_{oc}} = \frac{DPCH\_Ec}{I_{or}} \times \frac{I_{or}}{I_{oc}}.$$

As geometry factor is equivalent to estimate $I_{or}/I_{oc}$ for particular physical channel DPCH, it corresponds to $$\frac{DPCH\_Ec}{I_{oc}}.$$

These geometry conditions have direct impact on the reception conditions, i.e. on a signal-to-noise ratio of the receiver. This $$\frac{DPCH\_Ec}{I_{oc}}$$

parameter represents the ratio of the transmit energy per pseudo-noise chip of the DPCH (Dedicated Physical Channel) to the total transit power spectral density at the Node B antenna.

According to an aspect of the invention, a parameter of the BTFD is initially set according to the reception conditions of the receiver.

It can therefore be set according the geometry conditions of the receiver, and more specifically according to this DPCH_Ec/Ioc parameter.

Thanks to this, the DPCM will better adapt to the transmission conditions, e.g. noise, in the transmission channel between the emitter and the receiver. The decoding can then benefit from FDR mitigation in bad transmission conditions, while still preventing any BLER performance regression.

Figure 4:
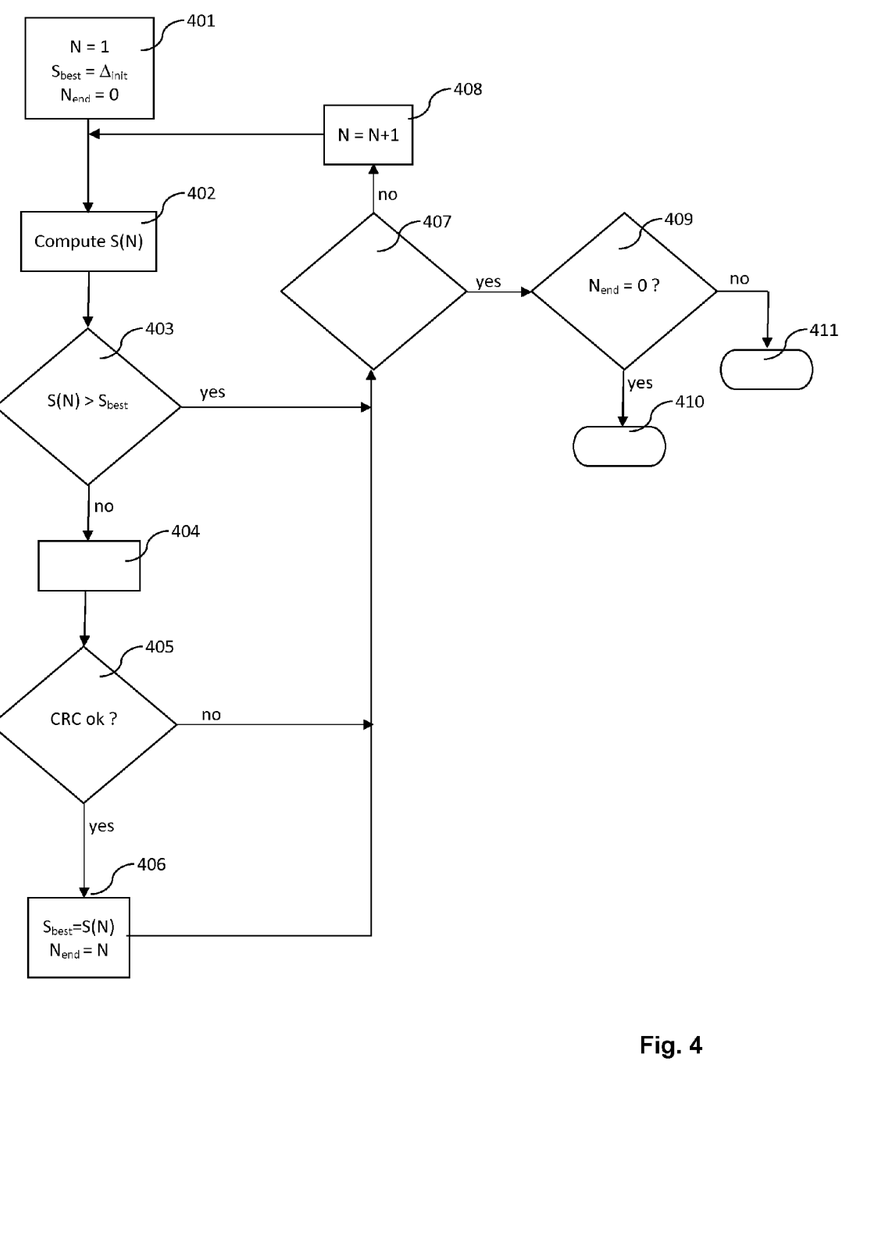
FIG. 4 shows a flowchart according to an embodiment of the invention.

The FIG. 4 shows a flow chart of an embodiment of the invention.

The first step 401 is an initializing step.

It comprises the selecting a length candidate among a length candidates set.

This length candidate set may have been negotiated earlier between the two parties, the emitter and the receiver. As it is a step known in the art, it will not be further explained here. The length candidates may be successive bit lengths (like 7, 8, 9 . . . bits) or not.

More concretely, the first step 401 selects an initial index N in the cardinal of the length candidates set. Typically, this initial index is set to 1, meaning that the first length candidate will be first handled.

The initializing step 401 also comprises setting a best length value $N_{end}$ to 0. This value means that at the start of the BTFD no solution has been found.

The initializing step 401 further comprises setting an initial value to a threshold Δ. This threshold is the one to which the Viterbi variable S(N) of the current length candidate N will be compared.

According to an aspect of the invention, the initial value of this threshold is set according to the conditions of reception of the receiver.

More precisely, the threshold Δ can be defined as a function of one or several criteria M representative of these conditions of the receiver. In other words, it is possible to write Δ=f(M). This function can be of different nature, continuous or not, as it will be explained below in some embodiments.

These criteria can comprise a signal-to-noise ratio (SNR). For instance, this ratio SNR can be estimated by the DPCH_Ec/Ioc parameter as earlier explained.

The general formula Δ=f(M) can then be instantiated as:

$$\Delta = f\left(\frac{DPCH\_EC}{I_{oc}}\right)$$

Several embodiments are possible to determine the threshold according to the DPCH_Ec/Ioc parameter. In other words, several function f are possible.

A first embodiment can consist in selecting a value for the threshold Δ among two values $\Delta_{high}$, $\Delta_{low}$ according to a comparison with pivot value PV of the DPCH_Ec/Ioc parameter.

A relationship can be provided by the following equations:

$$\text{If } \frac{DPCH\_EC}{I_{oc}} < PV, \text{ then } \Delta = \Delta_{high} \quad (2a)$$

$$\text{If } \frac{DPCH\_EC}{I_{oc}} > PV, \text{ then } \Delta = \Delta_{low} \quad (2b)$$

Figure 5:
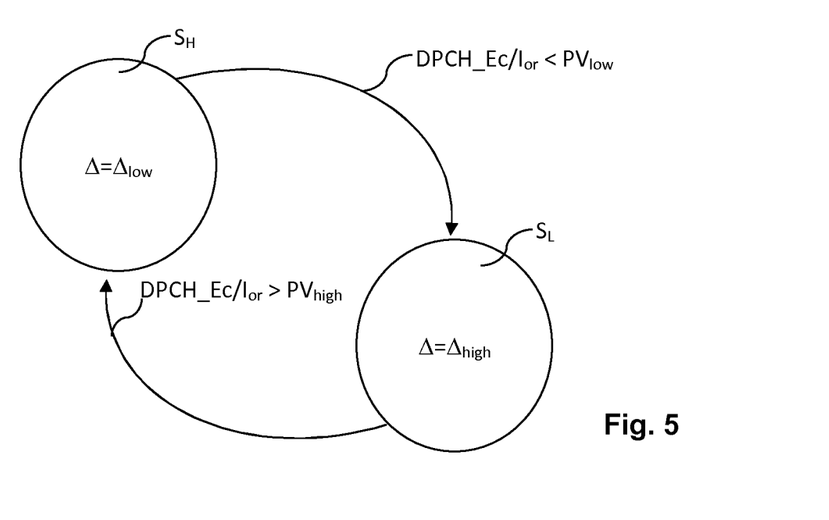
FIG. 5 shows a state diagram related to an embodiment of the invention.

According to a second embodiment of the invention, a hysteresis approach is used with two pivot values $PV_{high}$ and $PV_{low}$ as illustrated by the FIG. 5. This approach can be represented by two states $S_H$, $S_L$.

In a high state $S_H$, the threshold Δ is set to a high value $\Delta_{high}$; while in a low state $S_L$, it is set to a low value $\Delta_{low}$.

The transition from the high state $S_H$ to the low state $S_L$ is triggered by the condition $$\frac{DPCH\_EC}{I_{oc}} < PV_{low}$$

The transition from the low state $S_L$ to the high state $S_H$ is triggered by the condition $$\frac{DPCH\_EC}{I_{oc}} < PV_{high}$$

The values to be used for the thresholds $\Delta_{low}$, $\Delta_{high}$ and the pivot values PV, $PV_{low}$ and $PV_{high}$ should be carefully set.

The inventor has made numerous tests from which it has been determined that a too-low threshold does not filter out enough wrong length candidates. It implies too much CRC errors and an unacceptable increase of the FDR (False Format Detection Ratio).

On the other side, increasing too much the threshold may improve the FDR parameter in noisy reception conditions, but it implies losing some potentially good length candidates especially in good reception conditions. The BLER parameter may increase even beyond the maximum value admissible by the 3GPP standards.

It is therefore important to choose the pivot values so as the excursion of the thresholds is kept within a range of optimal values when BLER and FDR parameters are kept in acceptable range both in good reception conditions and bad reception conditions.

The numeral values can be determined according to the specificity of the circuitry used to implement the receiver.

Examples of numeric values used in the context of an actual embodiment of the invention made by the inventor are as follow:

For instance, when a single pivot value is used, its value can be PV=−19 dB. The thresholds can be $\Delta_{low}=0$; $\Delta_{high}=0.7$ for examples.

In the hysteresis approach, the values can be $PV_{high}=-17$ dB and $PV_{low}=-20$ dB, with thresholds like $\Delta_{low}=0.2$; $\Delta_{high}=0.8$.

According to other embodiments, instead of the DPCH_Ec/Ioc parameter, an estimation of a signal to interference ratio (SIR) is used to determine the thresholds and the pivot values. Indeed, the DPCH_Ec/Ioc parameter is difficult to be known by the receiver. So, an alternative is to use an estimation that can be measured by receiver's circuitry.

This estimation is a SIR measurement measured on the DPCH channel.

This can be determined in various ways. One possible implementation of the SIR estimation on the DPCH channel is given by the following equation:

$$SIR^{DPCH} = \frac{256}{sf} \times \left[\frac{C_{data}}{c\sqrt{SIR^{CPICH}}}\right]^2$$

Where:

$SIR^{CPICH}$ is a SIR estimation on the CPICH, Common Pilot Channel. This CPICH channel is a physical channel carrying pilot data which are known by the user equipment (UE) and used to compute the SIR estimation in classical way by filtering ratio between useful signal estimated power (i.e. total power minus noise power) and estimated interference power.

sf is the spreading factor used in the transmission on the DPCH channel. 256 being the spreading factor for the CPICH, the ratio 256/sf is a scaling factor.

c is a constant scaling factor depending on the DPCH spreading factor sf. The dependency can be expressed for instance as: $c^2=\sqrt{2^w}$, in which:

$$w = \begin{cases} 2 & \text{for } sf \in \{8,16,32,64\} \\ 1 & \text{for } sf = 128 \\ 0 & \text{for } sf = 256 \end{cases}$$

$C_{data}$ is defined such as $(C_{data})^2$ should be equal to total_slot_power, i.e. to $$\sum_{received\_slots} (soft\_bits)^2$$

This SIR measurement can be used in the various embodiments given above, so that the threshold Δ is made dependent of this SIR, as representative of the conditions of reception of the receiver.

After this initializing step 401, the BTFD comprises a step 402 consisting in decoding a received frame to form a decoded sequence. This decoded sequence of bits includes a message of a length equal to the length candidate N.

This step consists in applying a Viterbi decoding algorithm on this receiving frame based on this length candidate, so as to determine the Viterbi variable S(N).

In a next step 403, this Viterbi variable S(N) is compared with a current best value $S_{best}$. This best value $S_{best}$ has been initialized to the threshold Δ in the first step 401. It is thus initially dependent on the reception conditions of the receiver. It can be updated at each pass of the algorithm when a better value is found, as it will be explained later on.

This comparison determines whether the currently tested length candidate is a potentially good one or not. If the current S(N) is not below the current best solution $S_{best}$, then it means this is not a potentially good enough candidate. The flow goes to the step 407 where it is tested whether there still exists a length candidate available (a not yet already selected) in the length candidate set. In the case at least one unselected length candidate exists, the step 408 consists in selecting a new length candidate among this set. This selection step 408 can simply consist in increasing the candidate index N by 1, so as to pick up the next one in the ordered length candidates' set.

Once a new length candidate selected, the decoding and calculating step 402 is repeated.

The loop among the steps 402, 403, 407 and 408 terminates when a selected length candidate N provides a Viterbi variable S(N) above the best value $S_{best}$ (and then the flow goes on to step 404), or when there is not more unselected length candidate in the set. Then, the flow goes from step 407 to step 409.

This step 409 tests the best length candidate that has been found. Again, we can here face to two situations by assessing the best length value $N_{end}$. If this value is equal to zero, it means that process has not been able to find any possible length candidate. In this situation, the process shall return an error by going to the step 410.

If this best length value $N_{end}$ is not equal to zero, it means that a possible best length candidate has been found. This best length value can be outputted in the step 411 as the best estimate of the real number of bits k of the received message.

Going now back to the step 403, if the current Viterbi variable S(N) is greater than the best value $S_{best}$ the current solution (based on the current length candidate) is traced back by the Viterbi decoder in the step 404. This allows outputting a block of bits according to the current value of the length candidate N. This step can be performed according to prior art techniques about Viterbi decoding and BTFD processes.

In a following step 405, this block of bits is then processed by a CRC checker (Cyclic Redundancy Check). If the CRC is not correct, then it means that the current length candidate is not a correct one and the flow loops back to the step 407.

According to the invention, the good selection of the threshold Δ reduces the probability that a CRC error happens, and thus of the loop back to step 407.

If the CRC is correct, it means that the currently selected length candidate N is the best one. Therefore, the best value $S_{best}$ and the best length $N_{end}$ should be updated as follows:

$S_{best}=S(N)$
$N_{end}=N$

Then the process loops back to step 407 to determine if another length candidate can be selected or not. The potentially new length candidates will be compared with the updated best value $S_{best}$. If there is no more length candidate, the current best length $N_{end}$ will be outputted as the best estimation of the real length of the received message to decode.

It should be noted that in this embodiment only one test is performed on the Viterbi variable S(N). This embodiment is optimized to reduce the processing time.

However the invention can also apply to other embodiments of the BTFD algorithm, especially when two subsequent tests are performed as in the 3GPP standards, i.e. a comparison with the threshold Δ and a comparison with the current best value $S_{best}$.

In other words, according to the BTFD process defined in the 3GPP standard, in the step 403, the current Viterbi value S(N) is compared to the threshold Δ. This threshold Δ is fixed and an additional step can be inserted after the CRC check 405 for comparing the current Viterbi value S(N) with the best value $S_{best}$.

In the previously described embodiment, this step of comparing the Viterbi variable S(N) with the threshold Δ is replaced by a step of comparing the Viterbi variable with the best value $S_{best}$, which has been initially set to this threshold Δ.

The invention claimed is:

1. A method for determining a length of a message block of k bits from a length candidate set, received by a receiver through a wireless communication channel, comprising steps of:
   selecting a length candidate among said length candidate set;
   decoding a received frame to form a decoded sequence that includes a message of a length equal to said length candidate, by a Viterbi decoder;
   calculating a Viterbi variable for said length candidate, by said Viterbi decoder;
   comparing said Viterbi variable with a threshold,
   repeating the selecting, decoding and calculating steps if said Viterbi variable is greater than said threshold value, and if there exists an unselected length candidate among said length candidate set;
   if said Viterbi variable is greater than a best value, updating said best value to said Viterbi variable and updating a best length to said length candidate;
   wherein said threshold is initially defined as a function of at least a noise-to-signal ratio estimated by a channel parameter representing a ratio of transmit energy per pseudo-noise chip of the channel to a total transmit power spectral density.

2. A method according to claim 1, wherein said best length is considered as the best estimate of k when all length candidates of said set have been selected and if said best length is not null.

3. A method according to claim 1, wherein said threshold is set to a high value when said at least one criterion is below a pivot value and to a low value when said at least one criterion is above said pivot value.

4. A method according to claim 1, wherein a hysteresis approach is used between a low state where said threshold is set to a low value and a high state where said threshold is set to a high value, and wherein the transition from said high state to said low state is triggered when said parameter is below a low pivot value and the transition from said low state to said high state is triggered when said parameter is above a high pivot value.

5. A method according to claim 1, wherein the channel parameter is a Dedicated Physical Channel ratio of transmit energy per pseudo-noise chip for the channel to a total transmit power spectral density (DPCH_Ec/Ioc) parameter.

6. The method of claim 1, wherein said threshold is fixed.

7. The method of claim 1, wherein the step of comparing said Viterbi variable with a threshold is replaced by a step of comparing said Viterbi variable with said best value, said best value being initially set to said threshold.

8. The method of claim 1, further comprising a step of tracing back from said length candidate by said Viterbi decoder.

9. The method of any of claim 1, further comprising a step of computing a CRC check on the block of bits outputted by said Viterbi decoder.

10. A computer program product comprising a non-transitory computer readable medium, having thereon a computer program comprising program instructions, the computer program being loadable into a data-processing unit and adapted to cause execution of the method according to claim 1 when the computer program is run by the data-processing unit.

11. A non-transitory data storage medium having recorded thereon a computer program comprising instructions for performing the method according to claim 1.

12. A receiver for determining a length of a message block of k bits from a length candidate set, received through a wireless communication channel to which said receiver is connected, comprising:
   a Viterbi decoder configured to
   select a length candidate among said length candidate set;
   decode a received frame to form a decoded sequence that includes a message of a length equal to said length candidate;
   calculate a Viterbi variable for said length candidate;
   compare said Viterbi variable with a threshold,
   repeat the selecting, decoding and calculating steps if said Viterbi variable is greater than said threshold value, and if there exists an unselected length candidate among said length candidate set;
   if said Viterbi variable is greater than a best value, update said best value to said Viterbi variable and updating a best length to said length candidate; and
   wherein said threshold is initially defined as a function of at least a noise-to-signal ratio estimated by a channel parameter representing a ratio of transmit energy per pseudo-noise chip of the channel to a total transmit power spectral density.

13. The receiver of claim 12, wherein the channel parameter is a Dedicated Physical Channel ratio of transmit energy per pseudo-noise chip for the channel to a total transmit power spectral density (DPCH_Ec/Ioc) parameter.

* * * * *